United States Patent
Kiraly et al.

(10) Patent No.: US 8,411,919 B2
(45) Date of Patent: Apr. 2, 2013

(54) FLUID DYNAMICS APPROACH TO IMAGE SEGMENTATION

(75) Inventors: Atilla Peter Kiraly, Plainsboro, NJ (US); Leo Grady, Yardley, PA (US); Christopher V. Alvino, Plainsboro, NJ (US)

(73) Assignee: Siemens Aktiengesellschaft, München (DE)

( * ) Notice: Subject to any disclaimer, the term of this patent is extended or adjusted under 35 U.S.C. 154(b) by 903 days.

(21) Appl. No.: 12/496,959

(22) Filed: Jul. 2, 2009

(65) Prior Publication Data

US 2010/0002925 A1    Jan. 7, 2010

Related U.S. Application Data

(60) Provisional application No. 61/078,463, filed on Jul. 7, 2008.

(51) Int. Cl.
*G06K 9/00* (2006.01)
*G06K 9/34* (2006.01)

(52) U.S. Cl. .................... 382/128; 382/100; 382/173

(58) Field of Classification Search .................. None
See application file for complete search history.

(56) References Cited

U.S. PATENT DOCUMENTS

| | | | | |
|---|---|---|---|---|
| 5,768,412 A * | 6/1998 | Mitsuyama et al. | ........ | 382/173 |
| 6,023,637 A * | 2/2000 | Liu et al. | ........ | 600/474 |
| 7,397,948 B1 * | 7/2008 | Cohen et al. | ........ | 382/167 |
| 7,471,816 B2 * | 12/2008 | Palmer | ........ | 382/128 |
| 7,817,841 B2 * | 10/2010 | Padfield et al. | ........ | 382/133 |
| 8,090,164 B2 * | 1/2012 | Bullitt et al. | ........ | 382/128 |
| 8,121,363 B2 * | 2/2012 | Chiakpo et al. | ........ | 382/128 |
| 2003/0053667 A1 * | 3/2003 | Paragios et al. | ........ | 382/128 |
| 2007/0003115 A1 * | 1/2007 | Patton et al. | ........ | 382/128 |
| 2007/0014452 A1 * | 1/2007 | Suresh et al. | ........ | 382/128 |
| 2007/0109874 A1 * | 5/2007 | Padfield et al. | ........ | 365/189.04 |
| 2008/0260225 A1 * | 10/2008 | Szu | ........ | 382/128 |
| 2008/0294038 A1 * | 11/2008 | Weese et al. | ........ | 600/431 |
| 2008/0304616 A1 * | 12/2008 | Van Uitert et al. | ........ | 378/4 |
| 2009/0097731 A1 * | 4/2009 | Sanada et al. | ........ | 382/132 |
| 2009/0208073 A1 * | 8/2009 | McIntyre et al. | ........ | 382/128 |
| 2009/0208422 A1 * | 8/2009 | Mardor et al. | ........ | 424/9.364 |
| 2010/0086185 A1 * | 4/2010 | Weiss | ........ | 382/131 |
| 2010/0278405 A1 * | 11/2010 | Kakadiaris et al. | ........ | 382/131 |
| 2011/0110567 A1 * | 5/2011 | Jiang | ........ | 382/128 |
| 2012/0020538 A1 * | 1/2012 | Weiss | ........ | 382/131 |

OTHER PUBLICATIONS

Wijk, ("Image Based Flow Visualization", ACM Transactions on Graphics, Jul. 2002.*
Calamante et al ("Estimation of bolus dispersion effects in perfusion MRI using image-based computational fluid dynamics", NeuroImage 2003.*
Maurizot et al ("2D fluid motion analysis from a single image", 1998).*

* cited by examiner

*Primary Examiner* — Claire X Wang
*Assistant Examiner* — Avinash J Yentrapati
(74) *Attorney, Agent, or Firm* — Donald B. Paschburg; F. Chau & Associates, LLC (57) ABSTRACT

A method for segmenting image data within a data processing system includes acquiring an image. One or more seed points are established within the image. An advection vector field is computed based on image influences and user input. A dye concentration is determined at each of a plurality of portions of the image that results from a diffusion of dye within the computed advection field. The image is segmented into one or more regions based on the determined dye concentration for the corresponding dye.

19 Claims, 5 Drawing Sheets

FLUID DYNAMICS APPROACH TO IMAGE SEGMENTATION

CROSS-REFERENCE TO RELATED APPLICATION

The present application is based on provisional application Ser. No. 61/078,463, filed Jul. 7, 2008, the entire contents of which are herein incorporated by reference.

BACKGROUND OF THE INVENTION

1. Technical Field

The present disclosure relates to image segmentation and, more specifically, to a fluid dynamics approach to image segmentation.

2. Discussion of Related Art

Image segmentation relates to the field of processing digital images to accurately distinguish between multiple objects that appear within the image. Image segmentation may be performed for either two-dimensional images or three-dimensional images, still images or moving images, and may be performed for all forms of images, regardless of their modality. While image segmentation may be performed on photographic images, image segmentation is particularly useful in the field of medical imaging. For example, image segmentation may be performed on CT or MR images to distinguish between various organs and other anatomical structures. By accurately distinguishing between anatomical structures within medical images, other medical image processing techniques may be more accurately performed, for example, to detect polyps, lesions, tumors from various portions of the body. Accordingly, image segmentation may play an important role in computer-aided detection of various diseases.

There are many techniques for performing image segmentation. Many techniques involve prompting a user to inspect acquired image data and to provide one or more seed locations that the user knows to be inside of the region to be segmented and/or outside of the region to be segmented. Using this information, image segmentation may be automatically performed by an image processing system to distinguish between image pixels/voxels that are inside the region to be segmented and pixels/voxels that are outside of the region to be segmented.

According to one simple approach for image segmentation, the user may provide a seed location that is understood to be inside the region to be segmented. A region growing algorithm may then be performed wherein each pixel/voxel adjacent to the selected seed is analyzed to determine whether it represents a change of intensity, with respect to the seed pixel/voxel, in excess of a predetermined threshold. So long as the adjacent pixel/voxel does not represent a sufficiently large change of intensity, that pixel/voxel may be considered to be part of the region to be segmented and that pixel/voxel may then be considered a seed for future iterations of this recursive process. The process may end when all pixels/voxels adjacent to the pixels/voxels that are considered to be part of the region to be segmented represent a change of intensity that is in excess of the predetermined threshold.

However, such techniques are not without problems. For example, where the boundaries of the region to be segmented include one or more points of weakness, for example, due to insufficient contrast between the region and its surrounding tissue, the growing algorithm may escape the boundary and generate an over-inclusive segmentation. Moreover, areas of excessive contrast within the region to be segmented may result in the growing algorithm stopping prematurely and thus generating an under-inclusive segmentation. Image noise may also adversely affect region growing techniques by obfuscating actual boundaries and creating the appearance of boundaries where none exist.

Other approaches for segmentation include the Random Walker algorithm, described in detail below. This method overcomes difficulties associated with region growing, but still has disadvantages such as when the image contains very weak boundaries or intersecting objects such as vessels.

SUMMARY

Exemplary embodiments of the present invention relate to a fluid dynamics approach to image segmentation that computes or obtains an advection vector field from an image based on the imaging modality or a combination of the image and/or user input for general flow directions. The user may also specify seed locations inside regions to be segmented which act as sources and sinks of dye where a dye diffusion and advection computation is carried out on each label with the influence of image forces. The final steady dye concentrations are viewed as probability fields and thresholded to obtain a final segmentation.

A method for segmenting image data within a data processing system includes acquiring an image. One or more seed points are established within the image. A flow field is calculated for the image by using image features as influences of flow. The established one or more seed points are used as sources and sinks of at least one diffusive dye that is advected through the calculated flow field and limited in both advection and diffusion by image forces. A dye concentration is determined at each of a plurality of portions of the image that results from the diffusion of the dye ands its advection within the calculated flow field. $_{[k1]}$Directions of diffusion and advection are also influence by image features. The image is segmented into one or more regions based on the determined dye concentration for the corresponding dye.

One or more advection jets may be established within the image and the effects of the established one or more advection jets may be factored in calculating the flow field for the image. There may be one unique flow field for each diffusive dye.

The acquired image may be a two-dimensional or three-dimensional image. The acquired image may be a three-dimensional medical image and either a CT image, an MR image, a PET image or an ultrasound image. A flow field may be obtained directly from an imaging modality used in acquiring the image.

The one or more seed points may be established by a user identifying at least one location of the image that is known to be part of each of the one or more regions. The one or more seed points may be automatically established by identifying at least one location of the image that is known to be part of each of the one or more regions.

The one or more advection jets may be established by a user identifying directions of flow corresponding to particular seed points. The one or more advection jets may be automatically established by identifying directions of flow corresponding to particular seed points. The one or more seed points may be established by a user identifying at least one location of the image that is known to be part of each of the one or more regions and the one or more advection jets may be established by a user identifying directions of flow corresponding to particular seed points. The user may identify a seed point of the one or more seed points and an advection jet of the one or more advection jets substantially simultaneously by the use of a gesture-based input.

The flow field and final dye concentrations may be calculated using Navier-Stokes equations adapted to scale diffusion and advection based on image features, viscosity and diffusion rates. The adapted Navier-Stokes equations may take the following form:

$$\frac{\partial u}{\partial t} = -e^{\wedge}(-m_{v1}((u \cdot \nabla)I)^2)(u \cdot \nabla)u +$$
$$v\nabla \cdot [\nabla u \cdot \text{diag}(e^{\wedge}(-m_{v2}(\nabla I \cdot \nabla I)))] + f$$
$$\frac{\partial \rho}{\partial t} = -e^{\wedge}(-m_{d1}((u \cdot \nabla)I)^2)(u \cdot \nabla)\rho + k\nabla \cdot [\nabla \rho \cdot e^{\wedge}(-m_{d2}(\nabla I \cdot \nabla I)))] + S$$

wherein I represents the image, the vector u represents the flow field, $\rho$ is a dye distribution through a region, v the viscosity of the fluid, k is the diffusion rate of the dye, the vector f represents external forces influencing the flow, the vector s represents external influences to the dye, the terms $m_{v1}$ and $m_{d1}$ control the influence of the image on advection of the fluid and dye, and the terms $m_{v2}$ and $m_{d2}$ control the viscosity and diffusion of the vector field and the diffusion of the dye.

Each of the at least one diffusive dyes may correspond to a label and with respect to each label, the seed point(s) corresponding to a corresponding label may be established as dye sources and seed point(s) of other labels are established as dye sinks and wherein this step is performed for each label.

The dye concentration may be determined at a steady state, after a predetermined length of time, or at a point in which subsequent changes to the dye concentrations are insignificant. Alternatively, the dye concentration may be determined deterministically by a direct solution.

Segmenting the image based on the dye concentrations may include examining the image as a set of pixels/voxels, determining the concentration for each dye at each pixel/voxel, and segmenting the image into continuous regions of pixels/voxels in accordance with a dominant concentration of a particular dye.

A practical method of computing the dye concentrations would involve establishing the flow field first using the first equation, and then computing dye diffusion and advection using the second equation with the assumption that the flow field is fixed.

A method for segmenting image data within a data processing system includes establishing one or more seed points within an image, establishing one or more advection jets within the image, calculating a flow field for the image by using image features as influences of flow and factoring in the effects of the established one or more advection jets, using the established one or more seed points as sources and sinks of at least one diffusive dye that diffuses through the calculated flow field, determining a dye concentration at each of a plurality of portions of the image that results from the diffusion of the dye within the calculated flow field, and segmenting the image into one or more regions based on the determined dye concentration for the corresponding dye.

A computer system includes a processor and a program storage device readable by the computer system, embodying a program of instructions executable by the processor to perform method steps for segmenting image data within a data processing system. The method includes acquiring an image, establishing one or more seed points within the image, computing an advection vector field based on image influences and user input, determining a dye concentration at each of a plurality of portions of the image that results from a diffusion of dye within the computed advection field, and segmenting the image into one or more regions based on the determined dye concentration for the corresponding dye.

The method may additionally comprise establishing one or more advection jets within the image and factoring in the effects of the established one or more advection jets in determining the dye concentration at each portion of the image

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide a system and method for performing image segmentation that is highly accurate and efficient in terms of time and computational resources. While the simple region growing technique for image segmentation is described above, approaches for image segmentation according to exemplary embodiments of the present invention may utilize an alternative approach to determining which pixels/voxels are part of the region to be segmented and which pixels/voxels are not part of the region to be segmented. Additionally, there may be multiple different regions to be segmented within a single image and exemplary embodiments of the present invention may be used to quickly and accurately determine whether each pixel/voxel of the image belongs to a particular region to be segmented.

Rather than trying to immediately determine whether a pixel/voxel is part of a particular region to be segmented, exemplary embodiments of the present invention first seek to ascertain a probability that each particular pixel/voxel belongs to each particular region. After this probability has been calculated, the pixel/voxel may then be assigned to the region to be segmented in accordance with the highest probability of belonging to a particular seed.

Thus, where, for example, there are three regions to be segmented A, B, and C (one of which may be a background region), for a particular pixel/voxel, the probability of that pixel/voxel (located at (x,y,z)) being within region A may be calculated as $\rho_A(x,y,z)$, the probability of that pixel/voxel being within region B may be calculated as $\rho_B(x,y,z)$, and the probability of that pixel/voxel being within region C may be calculated as $\rho_C(x,y,z)$. Where $\rho_A(x,y,z) > \rho_B(x,y,z)$ and $\rho_A(x,y,z) > \rho_C(x,y,z)$, the voxel at x,y,z may be assigned to region A. Similarly, the voxel may be assigned to regions B or C where their respective probabilities are greatest.

Accordingly, it is important to be able to accurately determine the probabilities of the various pixels being part of the various regions to be segmented.

Exemplary embodiments of the present invention may build upon the random walker approach to determining these probabilities, for example, as described in U.S. Pat. No. 7,486,820 directed to, "System and Method for Multilabel Random Walker Image Segmentation Using Prior Models," which is herein incorporated by reference. According to the random walker approach, a user defines a seed for each region. Then, for each given pixel/voxel, the probability for that pixel/voxel being part of a given region is defined in accordance with the changes of a "random walker" beginning at that pixel/voxel from navigating to each respective seed point given the fact that image intensities affect how the otherwise random navigation is to occur. For example, navigation may be determined by defining the terms of movement to make it more likely that the random walker moves to an adjacent pixel/voxel that represents a smaller image gradient than it would be for the random walker to move to an adjacent pixel/voxel that represents a greater image gradient. Accordingly, large gradients represent paths of increased resistance and the random walker is more likely to find the path of least resistance.

However, while the random walker approach may be described in terms of defining respective region probabilities in terms of paths of least resistance from a particular pixel/voxel to each regional seed, the actual movement of the random walker need not be simulated. As there are analogues on the physical world that utilize paths of least resistance, the mathematical techniques of these physical models may be applied to the problem of calculating the regional probabilities of random walks from given pixels/voxels.

For example, in electronics, it is understood that electricity moves in a manner that takes advantage of paths of least resistance when traveling from one point to another point. Thus, if each pixel/voxel is thought of as a node, and the image intensity gradient between adjacent pixels/voxels is thought of as a measure of resistance between nodes, determining the probability of that pixel/voxel random walking to a given seed point may be calculated in terms of the way electricity would move between the nodes from the given pixel/voxel to the given seeds. By thinking of the problem in these terms, the understood mathematical constructs of electricity may be applied to calculate the respective regional probabilities of each pixel/voxel to provide a determinate solution for the regional probabilities that may be used to provide for image segmentation without performing an actual simulation.

Particularly relevant herein, the random walker approach may be interpreted in terms a diffusion of dye through a still body of water. Foreground seeds act like sources of dye, while background seeds absorb dye. The image gradients act as regions that impeded dye diffusion in certain directions. Thus dye diffusion, a component in the Navier Stokes equations, may be used to solve for the random walker probabilities. Exemplary embodiments of the present invention provide a more general approach that incorporates the advection component in the Navier Stokes equation to allow for more robust segmentations.

Exemplary embodiments of the present invention apply principals of fluid dynamics as a physical analogue for determining the probabilities that each pixel/voxel of image data belongs to a particular segmentation region. Accordingly, region probabilities for each pixel/voxel may be calculated, either deterministically or by simulation, and each pixel/voxel may be assigned to a particular region based on the calculated probabilities and the image may be segmented accordingly. These probabilities may relate directly to a physical analog of dye concentrations within a fluid, for example, a body of water.

According to the fluid dynamic approach, the image, either two-dimensional or three-dimensional, may be thought of as a body of water, with the image properties influencing advection and diffusion properties of the water and any dye diffusing and advecting in the water. A user may then identify one or more seeds for each region of segmentation and these seeds may be treated as sources or sinks for a diffusive dye. The diffusion and advection characteristics of the dye may be calculated in view of the advection and diffusion properties, either to determine a steady-state solution for dye concentrations at particular points or to determine dye concentrations at particular points after an elapsed length of time. The probability that each pixel/voxel is part of a particular region of segmentation may then be determined based on the concentration of the corresponding dye at the pixel/voxel after steady state or after the particular elapsed time. Segmentation may then be performed based on the calculated probabilities by simply assigning the largest probability to a particular label.

The Navier-Stokes equations are often used to solve for the velocity field or flow field of a system of fluids. By thinking of the image in as having an influence on diffusion and advection, the Navier-Stokes equations may be used to calculate a velocity vector field based on the image. Then, the user-defined seeds may be used as sources and sinks of dye and the diffusion of dye influenced by image forces in similar fashion to the random walker, and also influenced be advection though the fluid velocity field and image influences. The result is a concentration of dye throughout the image. The final concentration of dye at a particular point or steady state may then be used to calculate segmentation region probabilities and ultimately to obtain a segmentation.

Moreover, according to exemplary embodiments of the present invention, the vector field for advections may depend on factors other than image characteristics. For example, the advection vector field may be provided by a user and may contribute to the velocity fields that affect the dye diffusion and ultimately, image segmentation. These user-provided vector fields may be provided either prior to performing the fluid dynamic calculations or dynamically. For example, the user may provide specific vectors at locations when identifying seeds. These vectors can then be interpreted as jet streams that are used to compute a velocity field within the image. Additionally, or alternatively, the user may provide dynamic vector fields, for example, as a fluid dynamic simulation is being performed.

The seeds need not be user-defined. Exemplary embodiments of the present invention may automatically select seeds. Moreover, boundary conditions describing how the flow of fluid is to occur at the boundary of the image may be either automatically defined or user-selected.

Figure 1:
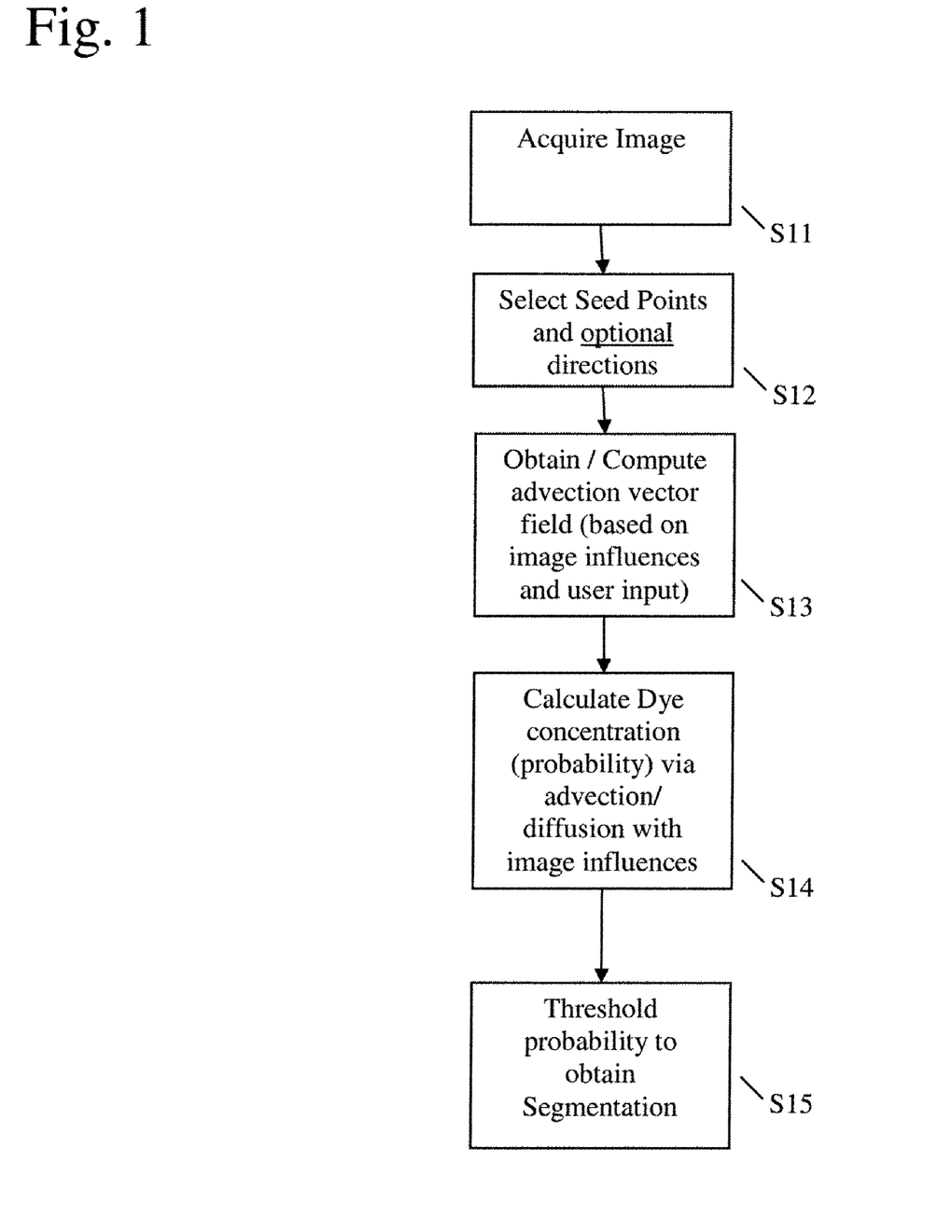
FIG. 1 is a flowchart illustrating an approach for performing image segmentation using fluid dynamics according to an exemplary embodiment of the present invention.

FIG. 1 is a flowchart illustrating an approach for performing image segmentation using fluid dynamics according to an exemplary embodiment of the present invention. First, image data may be acquired (Step S11). The image data may be either two-dimensional image data or three-dimensional image data. The image data may be color, black and white, or gray scale. The image data may be video data or a still picture. Image data may be acquired either digitally or by analogue means and later digitized. The image data may be visual data such as a photograph or video. Alternatively, the image data may be medical image data such as a conventional x-ray image, a CT scan, an MRI, an ultrasound, etc. Also, the image may also contain a vector associated with each pixel/voxel as in the case of MRI flow imaging or Diffusion Tensor Imaging DTI.

One or more seed points may then be selected from within the image data for each region of segmentation (Step S12). As described above, seed points may either be automatically selected or user-defined. Where the seed points are user-defined, the user may optionally also provide one or more advection influences in the form of directions. According to one exemplary embodiment of the present invention, the user may select seed points and advection influences at substantially the same time, for example, using a gesture-based interface where the user is presented with a display of the image data (or a frame or two-dimensional rendering thereof) and the user may touch the display at a seed point, either by physical contact to a touch-screen display or with a mouse-click, and then "drag" in a direction of an advection influence. Dragging may be performed either by moving a point of physical contact on a touch-screen in a particular direction while maintaining physical contact, or by moving the mouse cursor while holding down the mouse button. Other techniques for the entry of this sort of data may also be used. The user may drag in the direction in which the particular segmentation region extends to create a vector field preference for the advection component. For example, where a blood vessel is being segmented, the advection influence may be dragged substantially along the major axis of the blood vessel. The advection influence gesture is more than just a continuous line of seed points, although each pixel covered by the advection influence gesture may also be considered a seed point, the direction of the gesture may be used to create an advection current for the fluid within which the dye advects. This vector field may either be used directly or as a basis to compute a vector field for the entire image.

The user may provide at least one seed point for each region of segmentation, and each provided seed point may include an advection influence, as desired, for example in the manner described above. The user may either choose to provide such an advection influence or choose not to provide an advection influence for each seed point, depending upon the perceived need. As discussed above, the selected seed points may be used to represent sources and sinks of dye, wherein a different dye may be used for each region of segmentation.

The user may provide advection influences at this point however, the user may also provide interactive advection influences wherein the user interacts with the segmentation method either by giving initial inputs or continuing to add or adjust inputs based upon feedback from the algorithm. Finally, the vector field for advection may be obtained directly from the imaging modality, as is the case for flow MRI images.

With a gesture of the mouse or touch screen, the user can both select an initial point and a direction. This allows for a flow to be defined in a local area. Flow directions may also be defined without seeds being specified. The flows defined can then be evolved by the modified Navier-Stokes equations simultaneously with the diffusion process on vectors or to define a fixed flow field.

The flow field for the image along with dye diffusion may be calculated/modeled based on the Navier-Stokes equations or other fluid dynamics modeling equations, using the provided advection influences. Accordingly, the advection vector field may be obtained and/or calculated based on image influences and the optional user direction input, where provided (Step S13). As described above, the flow field may be calculated deterministically, modeled by simulation, or obtained directly from the imaging modality.

The Navier-Stokes equations for incompressible flow may be given by the following equations:

$$\frac{\partial u}{\partial t} = -(u \cdot \nabla)u + v\nabla^2 u = f \quad (1)$$

$$\frac{\partial \rho}{\partial t} = -(u \cdot \nabla)\rho + k\nabla^2 \rho = s \quad (2)$$

Here, the vector u represents the flow field, $\rho$ is a dye distribution through a region, v controls the viscosity of the fluid and k is the diffusion rate of the dye. If the value for k is relatively low, the dye may disperse by means of being carried with flow (advected) to a greater extend than by diffusion. The vector f represents external forces influencing the flow, for example, as defined by the provided advection influences, and the vector s represents external influences to the dye such as sources and sinks. Note that in these equations, diffusion and advection occur both to the vector field u as well as the dye $\rho$.

While the f and s terms may be used to incorporate such influences as dye and flow source and sinks, exemplary embodiments of the present invention modify the flow field to account for image influences. Image influences may factor into both the flow field characteristics and the diffusion and advection processes.

The image I may be defined in terms of $I: \mathfrak{R}^d \to \mathfrak{R}$ where $d \in \{2,3\}$ to represent either a two-dimensional or a three-dimensional image. Image influences may be applied based on the magnitude of the differences between intensities of two locations of the image such that the greater the dissimilarity between the two locations, the more resistance to diffusion and advection is present. While the exact relationship between image intensity differences and flow characteristics may be selected according to need, equations (3) and (4) below illustrate an exemplary relationship that makes use of an exponential of a scaled negative square of the differences:

$$\frac{\partial u}{\partial t} = -e^{\wedge}(-m_{v1}((u \cdot \nabla)I)^2)(u \cdot \nabla)u + v\nabla \cdot [\nabla u \cdot \text{diag}(e^{\wedge}(-m_{v2}(\nabla I \cdot \nabla I)))] + f \quad (3)$$

$$\frac{\partial \rho}{\partial t} = -e^{\wedge}(-m_{d1}((u \cdot \nabla)I)^2)(u \cdot \nabla)\rho + k\nabla \cdot [\nabla \rho \cdot e^{\wedge}(-m_{d2}(\nabla I \cdot \nabla I))] + S \quad (4)$$

where · in the exponential is a point-wise multiplication. Accordingly, in equations (3) and (4), an exponential function is used to scale the diffusion and advection based on the given image I. Both v and k control the viscosity and diffusion rates, as they do above, however, here, there are four additional terms $m_{v1}$, $m_{v2}$, $m_{d1}$, and $m_{d2}$. The terms $m_{v1}$ and $m_{d1}$ may control the influence of the image on advection of the fluid and dye, where larger values may result in reduced advection in regions of strong edges in the image (large intensity differences between adjacent image regions). The terms $m_{v2}$ and $m_{d2}$ may control the viscosity and/or diffusion of the vector field and the diffusion of the dye, respectively. Similarly, larger values may result in reduced viscosity/diffusion in regions of strong edges. Setting any of these parameters to zero may reduce equations (3) and (4) to the Navier-Stokes equations (1) and (2). As discussed above, other equations may be used to allow for the influences of the image on the flow field and diffusion.

The flow field and diffusion characteristics may be calculated/modeled based on a set of equations that have been modified to allow for image influences, such as using equations (3) and (4) above, or similar equations.

As discussed above, in selecting seed points and providing advection influences, either automatically or based on user input, multiple regions of segmentation may be defined. Each region of segmentation may represent a unique label. The user may provide at least two different labels where there is one region of segmentation, one label representing a seed within the region and another label representing a seed outside of the region (a background region). There need not be a background region, for example, where there are at least two regions of segmentation, however, there may always be at least two unique labels, with at least one seed point being defined for each label.

Moreover, as discussed above, flow locations or jets may also be defined automatically or through user input. These flow locations or jets may be associated with individual labels, groups of labels, or all labels. Alternatively, an entire static flow field may be provided instead of discrete flow locations or jets.

Equations (3) and (4) may be used to determine a final state of diffusion with the given parameters. As described above, the final state may be either a steady state or a state after a given amount of time has elapsed. However, multiple states may have to be determined depending upon the number of labels. Where L is the number of labels given, then either L−1 or L final states must be determined to obtain a final segmentation. In each of these states, one group of seeds always acts as a dye source, while the remainder act as a dye sink (absorbing the dye and reducing its concentration to zero that those points).

Given a specific label l, wherein $l \in L$, the given label l may be taken as a source of dye while the remaining labels may be considered sinks. Additionally, specific flows assigned to the label or a static flow field specific to the label may be applied. The application of Equations (3) and (4) until a steady state or after a pre-determined period of time may then determined. Any of a number of approaches to solving these equations may be used and the invention should not be understood as being limited to any one particular approach.

The result of solving the equations may be a density field for a particular label l. If the flow field is already given, then only equation (4) needs to be solved. Also, equations (3) and (4) may be solved simultaneously or equation (3) may be solved first to determine a static flow field and then apply equation (4) may be applied next. If a steady-state flow field is achievable, then it may be preferable to solve equation (3) prior to solving equation (4) rather than solving both equations simultaneously.

The above process may yields several density maps $\rho_i, i \in \{1, \ldots, L-1\}$ or $\rho_i, i \in \{1, \ldots, L\}$ depending upon whether a density map is computed for the background label. The density maps represent the concentration of a particular dye at a given region. Accordingly, the dye concentration for each label may be calculated as density maps based on advection and diffusion along with the influence of image characteristics and the density maps may be used to establish the probability that a given region is part of each particular region of segmentation (Step S14). Accordingly, the greater the concentration of a particular dye at a given region at steady state or after a particular amount of time, according to the respective density map, the greater the probability that the given region is part of the region that was tagged with the seed point corresponding to that particular dye.

Finally, segmentation may be performed based on the established probabilities (density maps) by thresholding the density maps to obtain segmentation (Step S15). The label of which region of segmentation is given to a particular location in the image may be based on the label with the highest density at that particular location. In the case of L−1 labels, the background label may be applied to a region with low densities for any remaining labels. It may also be possible to label regions as undecided where densities of approximately the same magnitude are present.

Below is described an exemplary performance of the described in detail above. According to this exemplary performance, the image to be segmented is two-dimensional for the purposes of providing a simplified example, although the same approach may be performed on a three-dimensional image. In this example, a static flow fields for three labels are given. The factors $m_{d1}$ and $m_{d2}$ are both set to 0.005 with k set to 1. In each case, the solution is determined after running the simulation until changes in the density distribution were minimal, thereby approximating a steady state. The dye concentration is kept constant at 100% at the source points and 0% at the sink points.

Figure 2:
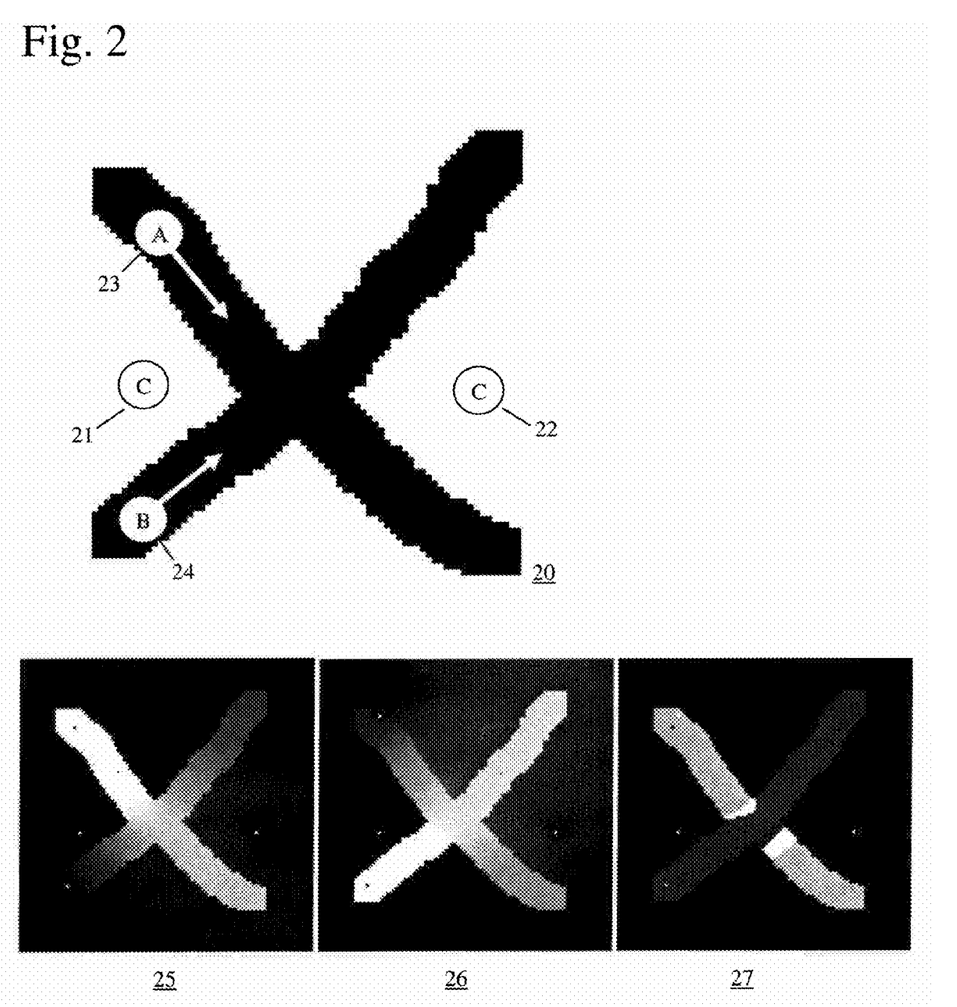
FIG. 2 is an illustration of a two-dimensional image to be segmented and segmentation results according to an exemplary embodiment of the present invention.

FIG. 2 is an illustration of a two-dimensional image to be segmented according to an exemplary embodiment of the present invention. The image resembles an "X" shape simulating two crossing objects such as vessels in a medical image. The optimal segmentation would include the separation of the two segments as distinct regions. The image 20 is seeded, here by a user, with seeds from three labels "A," "B," and "C." Two seeds 21 and 22 are placed on the outside of the "X" image 20 designating the background label "C". A seed 23 for the label "A" and a seed 24 for the label "B" are placed on the upper and lower regions within the "X" image 20.

A flow field pointing diagonally downwards and to the right is given to the seed 23 for the label "A" and an orthogonal flow field is given to the seed 24 for the label "B." These flow fields may be provided by the user using the gesturing technique discussed above.

In applying an approach for segmenting an image according to an exemplary embodiment of the present invention, the image 25 illustrates the density map (probability distribution) for the label "A" and the image 26 illustrates the density map (probability distribution) for the label "B." Here, the remainder of seeds act like dye sinks, bringing the concentration down to zero. As can be seen from images 25 and 26, the line of the image extending from the upper left to the lower right is most probably of label "A" and the line of the image extending from the lower left to the upper right is most probably of label "B." Image 27 illustrates the result of segmentation performed based on the probabilities displayed in images 25 and 26. As can be seen in this image, the two lines of the image are correctly segmented even though they overlap and have essentially equal intensities, a result that would not be achievable using techniques known in the art such as use of the growing algorithm as described in the background.

Figure 3:
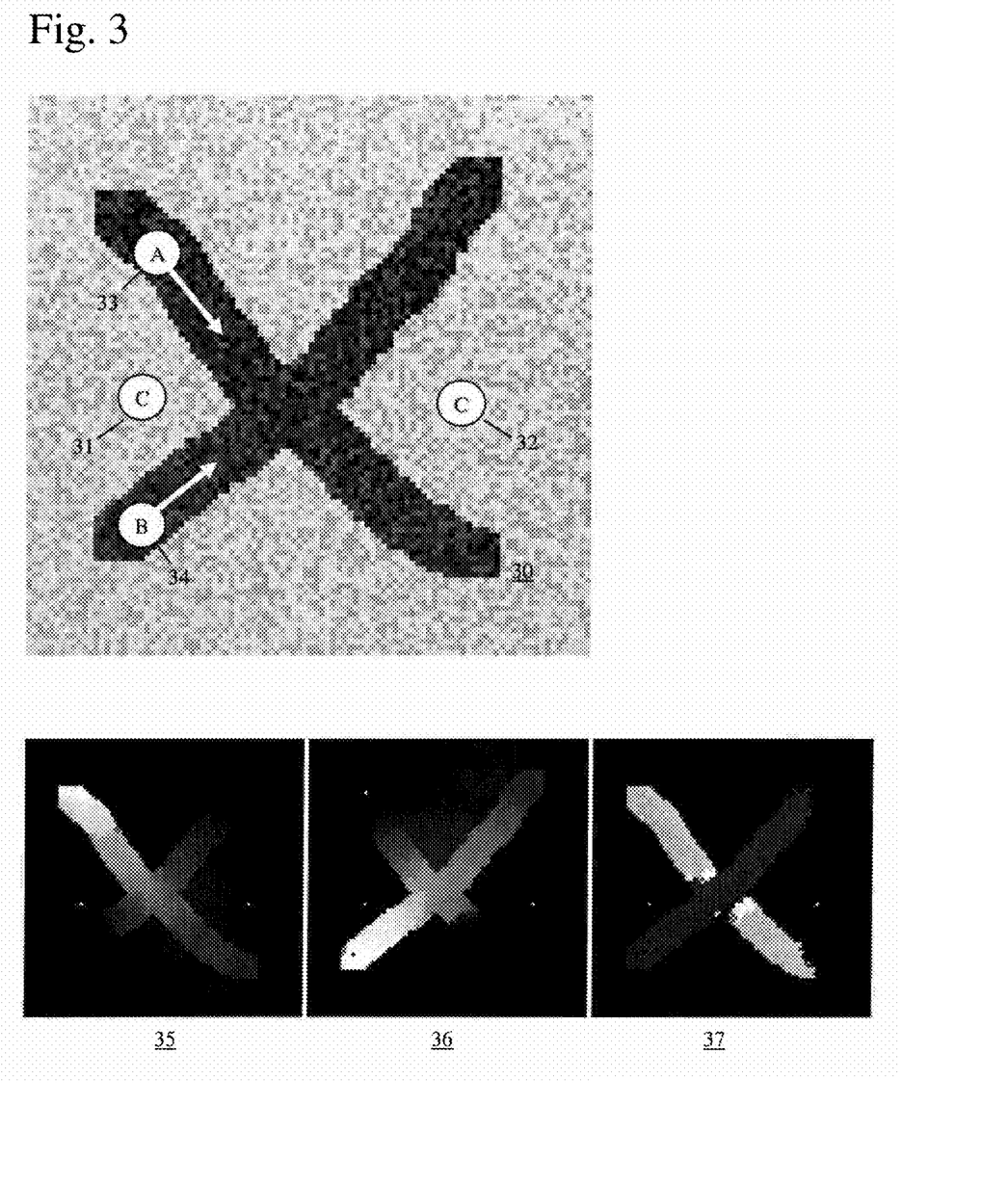
FIG. 3 is an illustration of a two-dimensional image to be segmented with noise added thereto and segmentation results according to an exemplary embodiment of the present invention.

Noise may also be added to the "X" image 20 of FIG. 2 and accurate segmentation results may still be achieved. FIG. 3 is an illustration of the image 20 to be segmented of FIG. 2 with noise added thereto. Segmentation according to exemplary embodiments of the present invention may be robust to noise and thus the noisy image 30 may be accurately segmented. According to this figure, the image 30 is seeded, here by a user, with seeds from three labels "A," "B," and "C." Two seeds 31 and 32 are placed on the outside of the "X" image 30 designating the background label "C". A seed 33 for the label "A" and a seed 34 for the label "B" are placed on the upper and lower regions within the "X" image 30.

A flow field pointing diagonally downwards and to the right is given to the seed 33 for the label "A" and an orthogonal flow field is given to the seed 34 for the label "B." In applying an approach for segmenting an image according to an exemplary embodiment of the present invention, the image 35 illustrates the density map (probability distribution) for the label "A" and the image 36 illustrates the density map (probability distribution) for the label "B." As can be seen from images 35 and 36, the line of the image extending from the upper left to the lower right is most probably of label "A" and the line of the image extending from the lower left to the upper right is most probably of label "B." Image 37 illustrates the result of segmentation performed based on the probabilities displayed in images 35 and 36. As can be seen in this image, the two lines of the image are correctly segmented even though they overlap and have essentially equal intensities, even when the original image 30 includes substantial noise.

Figure 4:
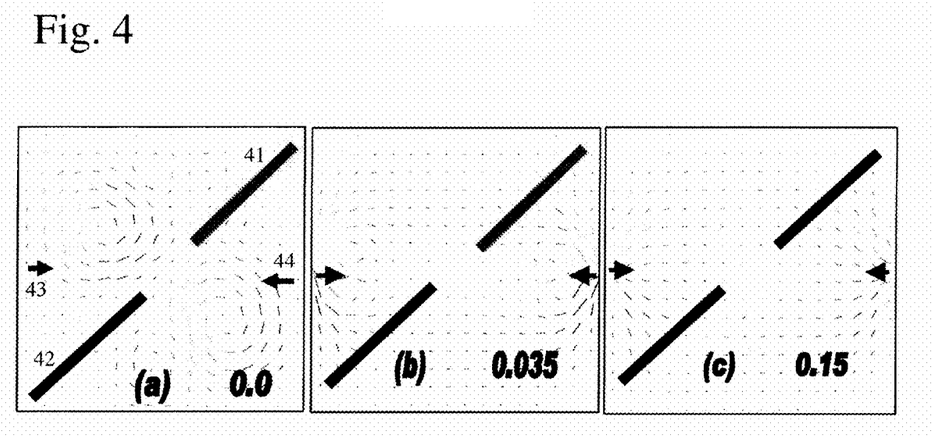
FIG. 4 illustrates exemplary flow fields generated on a simple boundary image with varying amounts of viscosity according to an exemplary embodiment of the present invention.

As discussed above, flow fields may be defined by user generated or automatically generated jet points. FIG. 4(a) illustrates exemplary flow fields generated on a simple boundary image with varying amounts of viscosity. The boundary image is defined by lines 41 and 42. Jets (43 and 44) are located at opposite ends of the image. FIG. 4(b) shows a flow field having the jet points wherein there is no fluid viscosity. Here, no stable solution is achieved and thus an unstable flow field is produced. The addition of even a slight amount of viscosity (e.g. 0.035 (FIG. 4(b) or 0.15 (FIG. 4(c)) may provide a stable solution, for example, as shown in FIGS. 4(b) and (c). Again, stability is defined herein as the condition when significant changes to the flow field no longer occur. Accordingly, with the application of viscosity in accordance with exemplary embodiments of the present invention, a stable solution may be achieved with smoother changes between nearby vectors. The stable flow field may thus be applied to dye diffusion and advection to obtain a segmentation. Since the dye does not influence the flow field, the flow field can be determined independently (preceeding) of the dye diffusion and advection.

An approach to image segmentation based on fluid dynamics is presented in detail above. A fluid dynamics simulation with image-based influences is used to determine diffusion densities of given seed points for labels. The method may take seed points and initial or preset velocity information to arrive at a density distribution per seed. Different flow fields are allowed for different labels. Densities are obtained by setting individual labels as sources and computing the final density distribution. Regions with the greatest concentration of a particular label are assigned that label.

As shown above, exemplary embodiments of the present invention may be able to separate a simulation of two crossing lines. Robustness is demonstrated on the same image with added noise. Accordingly, exemplary embodiments of the present invention may be able to quickly and accurately perform segmentation in regions where objects are crossing, such as vessels in medical images, or regions were boundaries are faint. The definition of a complete flow field by placing jets within an image and running a fluid simulation until a steady state is reached has also been described in detail above. Approaches to incorporate gestures into the input methodology to simultaneously describe a location and a velocity were presented.

Figure 5:
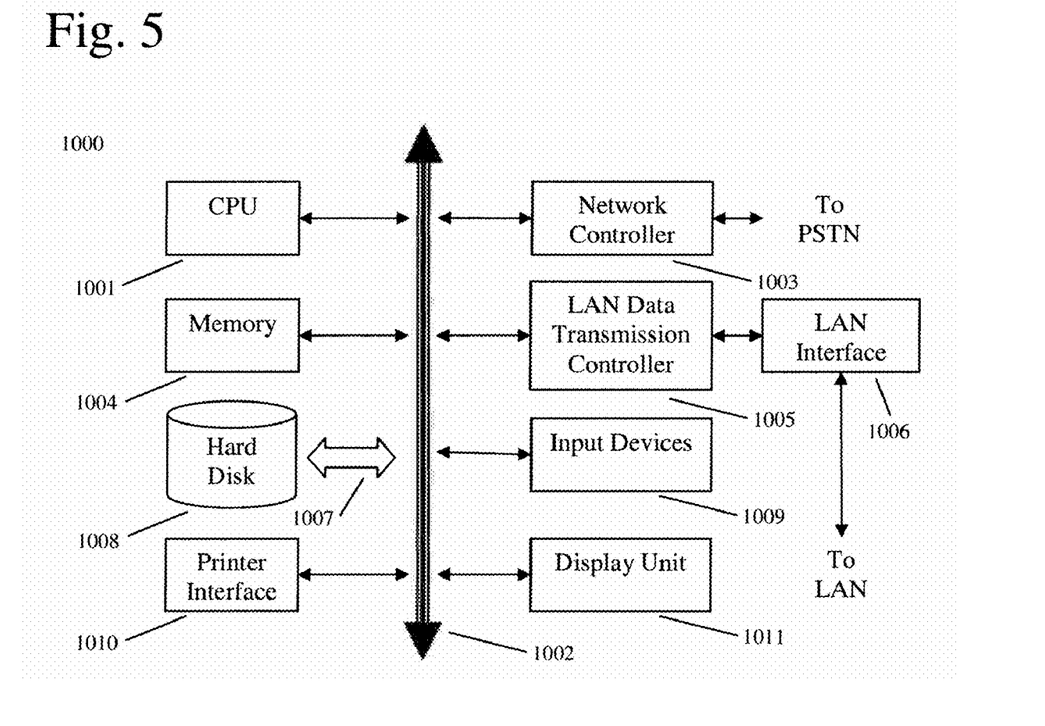
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for segmenting image data within a data processing system, comprising:
    acquiring static image of a physical structure;
    establishing one or more seed points within the image;
    modeling the physical structure of the static image as a fluid model;
    calculating a flow field for the fluid model by using image features of the physical structure of the image as influences of flow within the fluid model;
    using the established one or more seed points as sources and sinks of at least one diffusive dye that diffuses and advects through the calculated flow field;
    determining a dye concentration at each of a plurality of portions of the fluid model that results from the diffusion and advection of the dye within the calculated flow field; and
    segmenting the physical structure of the image into one or more regions based on the determined dye concentration for the corresponding dye within the fluid model,
    wherein segmenting the physical structure of the image based on the dye concentrations within the fluid model includes:
    examining the fluid model as a set of pixels/voxels;
    determining the concentration for each dye at each pixel/voxel;
    segmenting the fluid model into continuous regions of pixels/voxels in accordance with a dominant concentration of a particular dye; and
    carrying over the segmentation of the fluid model back into the physical structure of the image.

2. The method of claim 1, additionally comprising establishing one or more advection jets within the fluid model and factoring in the effects of the established one or more advection jets in calculating the flow field for the fluid model.

3. The method of claim 1, wherein there is one unique flow field for each diffusive dye.

4. The method of claim 1, wherein the acquired image is a two-dimensional or three-dimensional image.

5. The method of claim 1, wherein the acquired image is a three-dimensional medical image and either a CT image, an MR image, a PET image or an ultrasound image.

6. The method of claim 5, wherein a flow field for the fluid model is obtained directly from an imaging modality used in acquiring the image of the physical structure.

7. The method of claim 1, wherein the one or more seed points are established by a user identifying at least one location of the image that is known to be part of each of the one or more regions.

8. The method of claim 1, wherein the one or more seed points are automatically established by identifying at least one location of the image that is known to be part of each of the one or more regions.

9. The method of claim 2, wherein the one or more advection jets are established by a user identifying directions of flow corresponding to particular seed points.

10. The method of claim 2, wherein the one or more advection jets are automatically established by identifying directions of flow corresponding to particular seed points.

11. The method of claim 2, wherein:
the one or more seed points are established by a user identifying at least one location of the image that is known to be part of each of the one or more regions; and
the one or more advection jets are established by a user identifying directions of flow corresponding to particular seed points; wherein
the user identifies a seed point of the one or more seed points and an advection jet of the one or more advection jets substantially simultaneously by the use of a gesture-based input.

12. The method of claim 2, wherein the flow field is calculated using Navier-Stokes equations adapted to scale diffusion and advection based on image features, viscosity and diffusion rates.

13. A method for segmenting image data within a data processing system, comprising:
acquiring static image of a physical structure;
establishing one or more seed points within the image;
modeling the physical structure of the static image as a fluid model;
calculating a flow field for the fluid model by using image features of the physical structure of the image as influences of flow within the fluid model;
using the established one or more seed points as sources and sinks of at least one diffusive dye that diffuses and advects through the calculated flow field;
determining a dye concentration at each of a plurality of portions of the fluid model that results from the diffusion and advection of the dye within the calculated flow field;
segmenting the physical structure of the image into one or more regions based on the determined dye concentration for the corresponding dye within the fluid model,
the method additionally comprising establishing one or more advection jets within the fluid model and factoring in the effects of the established one or more advection jets in calculating the flow field for the fluid model,
wherein the flow field is calculated using Navier-Stokes equations adapted to scale diffusion and advection based on image features, viscosity and diffusion rates,
wherein the adapted Navier-Stokes equations take the following form:

$$\frac{\partial u}{\partial t} = -e^{\wedge}(-m_{v1}((u \cdot \nabla)I)^2)(u \cdot \nabla)u +$$

-continued
$$v\nabla \cdot [\nabla u \cdot \text{diag}(e^{\wedge}(-m_{v2}(\nabla I \cdot \nabla I)))] + f$$

$$\frac{\partial \rho}{\partial t} = -e^{\wedge}(-m_{d1}((u \cdot \nabla)I)^2)(u \cdot \nabla)\rho + k\nabla \cdot [\nabla \rho \cdot e^{\wedge}(-m_{d2}(\nabla I \cdot \nabla I)))] + S$$

wherein I represents the image, the vector u represents the flow field, ρ is a dye distribution through a region, v controls the viscosity of the fluid, k is the diffusion rate of the dye, the vector f represents external forces influencing the flow, the vector s represents external influences to the dye, the terms $m_{v1}$ and $m_{d1}$ control the influence of the image on advection of the fluid and dye, and the terms $m_{v2}$ and $m_{d2}$ control the viscosity and diffusion of the vector field and the diffusion of the dye.

14. The method of claim 1, wherein each of the at least one diffusive dyes corresponds to a label and with respect to each label, the seed point(s) corresponding to a corresponding label are established as dye sources and seed point(s) of other labels are established as dye sinks and wherein this step is performed for each label.

15. The method of claim 1, wherein the dye concentration is determined at a steady state, after a predetermined length of time, or at a point in which subsequent changes to the dye concentrations are insignificant.

16. The method of claim 1, wherein the dye concentration is determined deterministically by a direct solution.

17. A method for segmenting image data within a data processing system, comprising:
acquiring static image of a physical structure;
modeling the physical structure of the static image as a fluid model;
calculating a flow field for the fluid model by using image features of the physical structure of the image;
modeling a diffusive dye that diffuses and advects through the calculated flow field;
segmenting the physical structure of the image into one or more regions based on a determined dye concentration for the diffusive dye within the fluid model,
wherein segmenting the physical structure of the image within the fluid model includes:
examining the fluid model as a set of pixels/voxels;
determining the concentration for the diffusive dye at each pixel/voxel;
segmenting the fluid model into continuous regions of pixels/voxels in accordance with a concentration of the diffusive dye; and
carrying over the segmentation of the fluid model back into the physical structure of the image.

18. A computer system comprising:
a processor; and
a program storage device readable by the computer system, embodying a program of instructions executable by the processor to perform method steps for segmenting image data within a data processing system, the method comprising:
acquiring a static image of a physical structure;
establishing one or more seed points within the image;
modeling the physical structure of the image as a fluid model;
computing an advection vector field within the fluid model based on image influences and user input within the image of the physical structure;
determining a dye concentration at each of a plurality of portions of the fluid model that results from a diffusion and advection of dye within the computed advection field; and segmenting the physical structure of the image into one or more regions based on the determined dye concentration for the corresponding dye within the fluid model, wherein segmenting the physical structure of the image based on the dye concentrations within the fluid model includes:

examining the fluid model as a set of pixels/voxels;

determining the concentration for each dye at each pixel/voxel;

segmenting the fluid model into continuous regions of pixels/voxels in accordance with a dominant concentration of a particular dye; and carrying over the segmentation of the fluid model back into the physical structure of the image.

19. The computer system of claim 18, wherein the method additionally comprises establishing one or more advection jets within the fluid model and factoring in the effects of the established one or more advection jets in determining the dye concentration at each portion of the fluid model.

* * * * *